(12) United States Patent
Poss

(10) Patent No.: US 10,566,014 B2
(45) Date of Patent: Feb. 18, 2020

(54) DATA STORAGE DEVICE DETECTING RESISTANCE DELTA OF A SPIN TORQUE OSCILLATOR

(71) Applicant: Western Digital Technologies, Inc., San Jose, CA (US)

(72) Inventor: Joey M. Poss, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/295,889

(22) Filed: Mar. 7, 2019

(65) Prior Publication Data

US 2019/0279661 A1 Sep. 12, 2019

Related U.S. Application Data

(60) Provisional application No. 62/640,315, filed on Mar. 8, 2018.

(51) Int. Cl.
*G11B 5/00* (2006.01)
*G11B 5/09* (2006.01)
(Continued)

(52) U.S. Cl.
CPC .................. *G11B 5/09* (2013.01); *G11B 5/35* (2013.01); *G11B 5/17* (2013.01)

(58) Field of Classification Search
CPC .... G11B 2005/0021; G11B 2005/0005; G11B 5/314; G11B 5/012; G11B 5/00;
(Continued)

(56) References Cited

U.S. PATENT DOCUMENTS 8,582,240 B1 11/2013 Chen et al.
8,643,967 B2 2/2014 Katada et al.
(Continued)

FOREIGN PATENT DOCUMENTS

| CN | 104835510 B | 11/2017 |
|---|---|---|
| JP | 2013251042 A | 12/2013 |
| WO | 2015126326 A1 | 8/2015 |

OTHER PUBLICATIONS

Matsubara, Masato et al.; "Experimental Feasibility of Spin-Torgue Oscillator with Synthetic Field Generation Layer for Microwave Assisted Magnetic Recording"; Jornal of Applied Physics; vol. 109, Issue 7; Mar. 2011; http://aip.scitation.org/doi/abs/10.1063/1.3559539 (4 pages).

(Continued)

*Primary Examiner* — Nabil Z Hindi
(74) *Attorney, Agent, or Firm* — Patterson & Sheridan, LLP; Steven H. Versteeg

(57) ABSTRACT

A data storage device is disclosed comprising a head actuated over a disk, wherein the head comprises a spin torque oscillator (STO) element. The data storage device further comprises a differential amplifier comprising a first input coupled to a first end of the STO element and a second input coupled to a second end of the STO element. A bias current is applied to the STO element, and the bias current is adjusted. A resistance delta of the STO element is detected based on an output of the differential amplifier, wherein the resistance delta corresponds to a bias current level when the STO begins to oscillate.

20 Claims, 4 Drawing Sheets

(51) Int. Cl.
*G11B 5/35* (2006.01)
*G11B 5/17* (2006.01)

(58) Field of Classification Search
CPC ............. G11B 5/4907; G11B 5/2452; G11B 11/10543; G11B 11/10532; G11B 2005/0008; G11B 2020/2508
USPC .......... 360/59, 328; 369/13.13, 13.14, 13.33, 369/13.34
See application file for complete search history.

(56) References Cited

U.S. PATENT DOCUMENTS

| | | | |
|---|---|---|---|
| 8,896,947 B2 | 11/2014 | Koizumi et al. | |
| 8,917,465 B1 | 12/2014 | Contreras et al. | |
| 9,001,444 B1 * | 4/2015 | Contreras | G11B 5/127 360/31 |
| 9,030,783 B1 | 5/2015 | Braganca et al. | |
| 9,230,571 B1 | 1/2016 | Chen et al. | |
| 9,275,672 B2 | 3/2016 | Shiroishi et al. | |
| 9,305,584 B2 | 4/2016 | Koizumi et al. | |
| 9,368,135 B2 | 6/2016 | Gao | |
| 9,390,734 B2 | 7/2016 | Gao | |
| 9,691,415 B2 | 6/2017 | Koui | |
| 9,881,637 B1 * | 1/2018 | Wilson | G11B 5/02 |
| 10,056,098 B1 * | 8/2018 | Rajauria | G11B 5/012 |
| 10,121,497 B1 | 11/2018 | Takahashi et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 2008/0304176 A1 | 12/2008 | Takagishi et al. | |
| 2009/0059423 A1 | 3/2009 | Yamada et al. | |
| 2009/0310244 A1 | 12/2009 | Shimazawa et al. | |
| 2013/0250456 A1 | 9/2013 | Yamada et al. | |
| 2014/0139952 A1 | 5/2014 | Takeo et al. | |
| 2014/0177100 A1 | 6/2014 | Sugiyama et al. | |
| 2016/0027455 A1 | 1/2016 | Kudo et al. | |
| 2017/0236537 A1 | 8/2017 | Murakami et al. | |
| 2018/0268848 A1 | 9/2018 | Narita et al. | |
| 2019/0088274 A1 | 3/2019 | Narita et al. | |

OTHER PUBLICATIONS

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

* cited by examiner

DATA STORAGE DEVICE DETECTING RESISTANCE DELTA OF A SPIN TORQUE OSCILLATOR

CROSS-REFERENCE TO RELATED APPLICATIONS

This application claims benefit of U.S. Provisional Patent Application Ser. No. 62/640,315, filed Mar. 8, 2018, which is herein incorporated by reference.

BACKGROUND OF THE DISCLOSURE

Field of the Disclosure

Embodiments of the present disclosure generally relate to data storage devices, such as disk drives.

Description of the Related Art

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil to record magnetic transitions onto the disk surface in a process referred to as saturation recording. During read-back, the magnetic transitions are sensed by a read element (e.g., a magneto-resistive element) and the resulting read signal demodulated by a suitable read channel. Microwave assisted magnetic recording (MAMR) is a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

SUMMARY OF THE DISCLOSURE

A data storage device is disclosed comprising a head actuated over a disk, wherein the head comprises a spin torque oscillator (STO) element. The data storage device further comprises a differential amplifier comprising a first input coupled to a first end of the STO element and a second input coupled to a second end of the STO element. A bias current is applied to the STO element, and the bias current is adjusted. A resistance delta of the STO element is detected based on an output of the differential amplifier, wherein the resistance delta corresponds to a bias current level when the STO begins to oscillate.

In one embodiment, a data storage device comprises a disk; a head actuated over the disk, wherein the head comprises a spin torque oscillator (STO) element; and control circuitry comprising a differential amplifier comprising a first input coupled to a first end of the STO element and a second input coupled to a second end of the STO element, wherein the control circuitry is configured to: apply a bias current to the STO element; adjust the bias current; and detect a resistance delta of the STO element based on an output of the differential amplifier, wherein the resistance delta corresponds to a bias current level when the STO begins to oscillate.

In another embodiment, a method of operating a data storage device, the method comprises applying a bias current to a spin torque oscillator (STO) element of a head actuated over a disk; adjusting the bias current; and detecting a resistance delta of the STO element based on an output of a differential amplifier comprising a first input coupled to a first end of the STO element and a second input coupled to a second end of the STO element, wherein the resistance delta corresponds to a bias current level when the STO begins to oscillate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1:
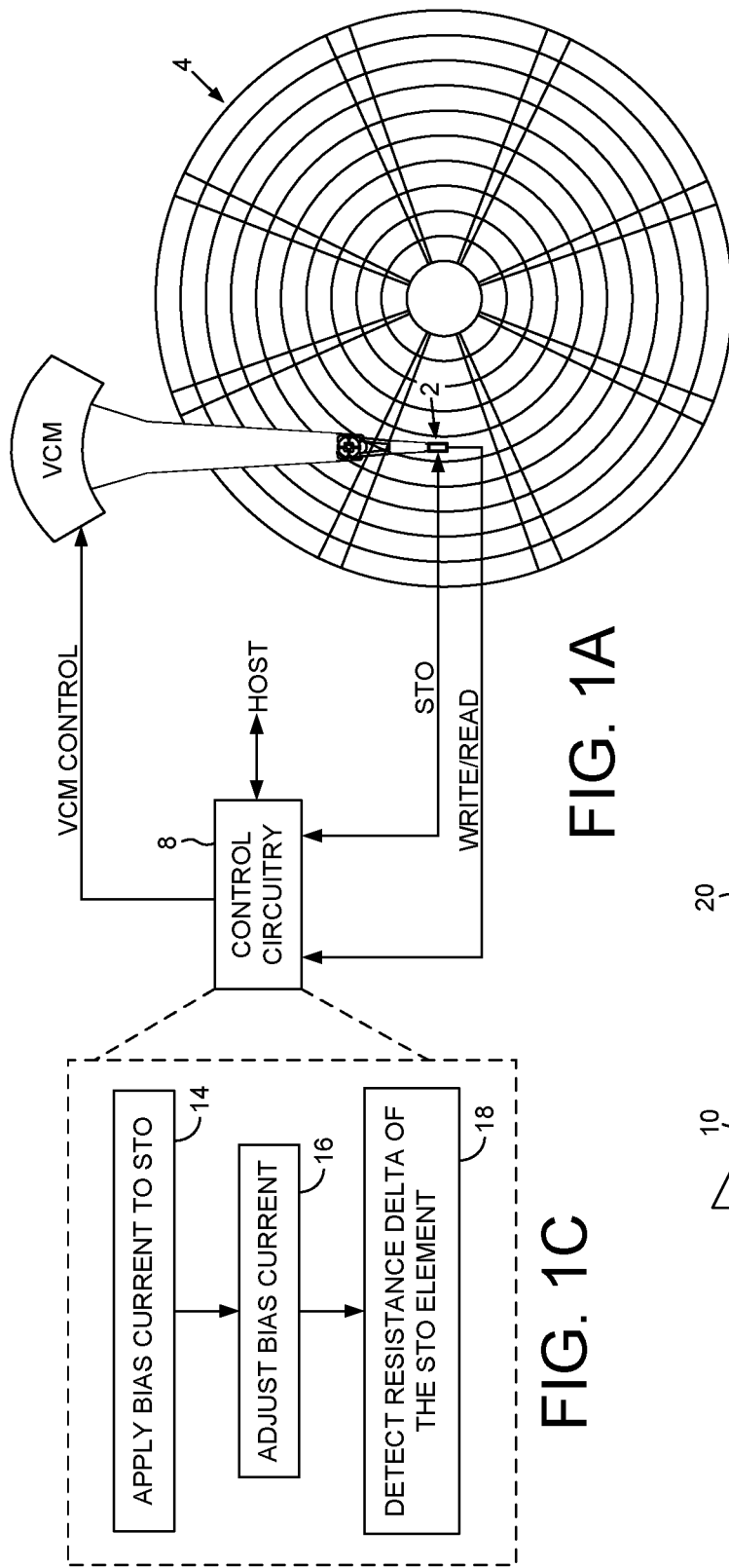
FIG. 1A shows a data storage device in the form of a disk drive according to an embodiment comprising a head actuated over a disk.
FIG. 1B shows control circuitry according to an embodiment comprising a first input coupled to a first end of a spin torque oscillator (STO) element and a second input coupled to a second end of the STO element.
FIG. 1C is a flow diagram according to an embodiment wherein a bias current applied to the STO is adjusted, and a resistance delta of the STO element is detected based on an output of the differential amplifier, wherein the resistance delta corresponds to a bias current level when the STO begins to oscillate.

FIG. 1A shows a data storage device in the form of a disk drive according to an embodiment comprising a head 2 actuated over a disk 4, wherein the head 2 comprises a spin torque oscillator (STO) element 6 (FIG. 1B). The disk drive further comprises control circuitry 8 comprising a differential amplifier 10 (FIG. 1B) comprising a first input coupled to a first end of the STO element 6 and a second input coupled to a second end of the STO element 6. The control circuitry 8 is configured to execute the flow diagram of FIG. 1C, wherein a bias current 12 is applied to the STO element (block 14), the bias current is adjusted (block 16), and a resistance delta of the STO element is detected 20 based on an output of the differential amplifier (block 18), wherein the resistance delta corresponds to a bias current level when the STO begins to oscillate.

Figure 2:
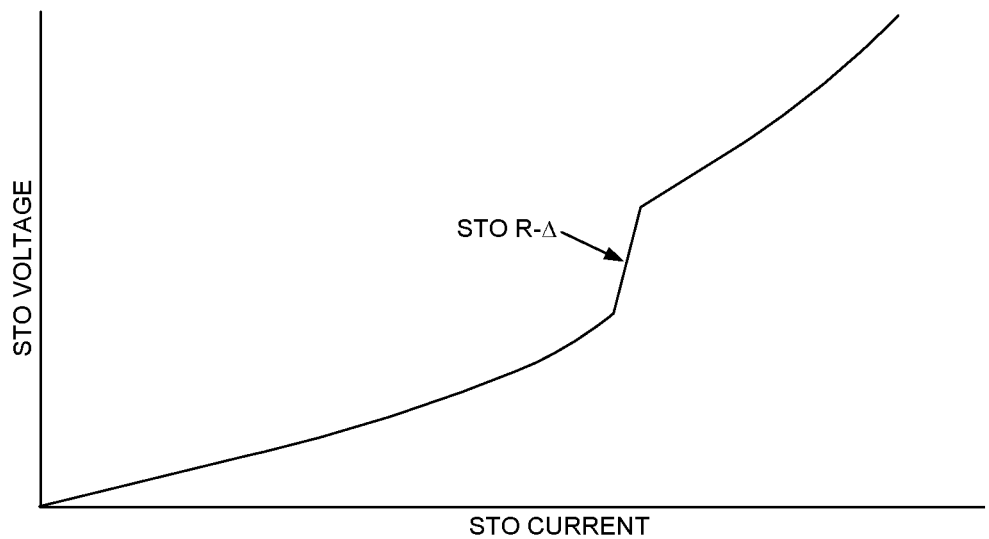
FIG. 2 shows the voltage across the STO element relative to the STO current, including an abrupt change in the STO voltage representing the detected resistance delta of the STO element according to an embodiment.

FIG. 2 shows a graph wherein the y-axis represents the voltage across the STO element 6, and the x-axis represents the STO current. The graph shows an abrupt change in the STO voltage when the STO current reaches an amplitude where the STO begins oscillating with a corresponding step increase in the STO resistance (resistance delta). There may be any suitable reason for detecting the amplitude of the STO current that causes the STO to begin oscillating, for example, when calibrating the operating bias current applied to the STO during write operation. In another embodiment, a failure to detect the resistance delta may indicate an inoperable STO, or a shift in the resistance delta may indicate a degradation of the STO element.

Any suitable technique may be employed in block 20 of FIG. 1B to detect the resistance delta of the STO element, such as by computing a differential (i.e., slope) of the graph shown in FIG. 2 and detecting when the differential exceeds a threshold. Block 20 may be implemented using analog or digital circuitry, or a combination of analog/digital circuitry. For example, block 20 may comprise a differentiator implemented using analog circuitry, or the output of the differential amplifier may be sampled and processed by digital circuitry to implement a digital differentiator equation (e.g., using a suitable state machine or microprocessor).

Figure 3:
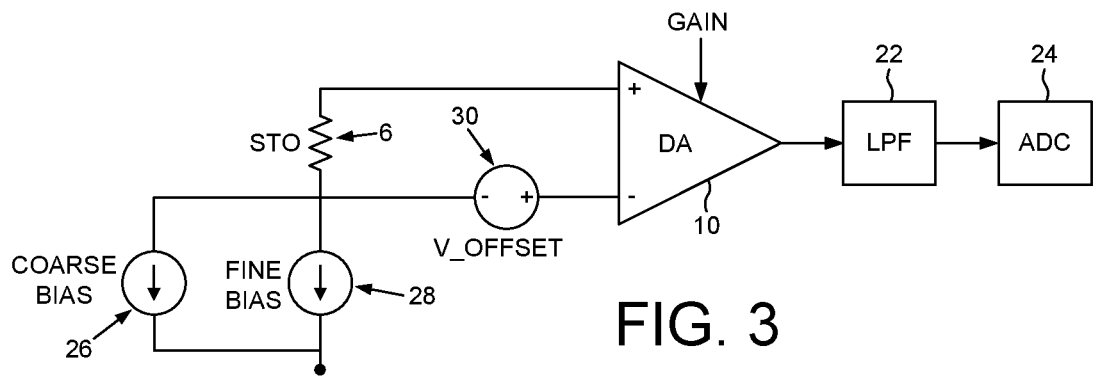
FIG. 3 shows control circuitry according to an embodiment wherein the bias current comprises a coarse bias current and a fine bias current, and an offset voltage is adjusted for each coarse step of the coarse bias current until the output of the differential amplifier is substantially zero.
Figure 4:
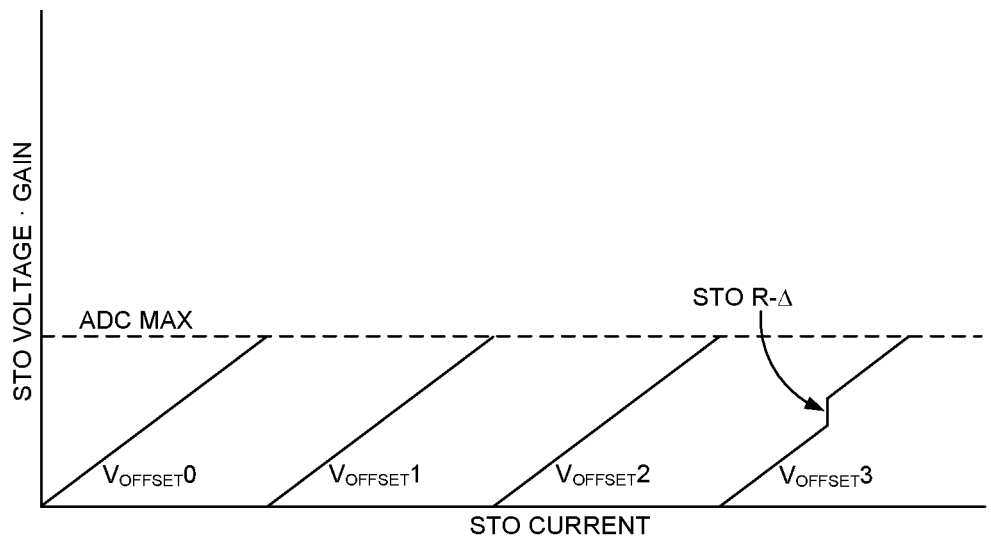
FIG. 4 illustrates how the offset voltage compensates for a limited input range of an analog-to-digital converter (ADC) according to an embodiment.

FIG. 3 shows control circuitry according to an embodiment wherein the output of the differential amplifier 10 is filtered using a suitable low-pass filter 22 to attenuate noise that may result in false detections of the STO resistance delta. The output of the low-pass filter 22 is sampled using an analog-to-digital converter (ADC) 24, wherein the digital values are processed to detect the STO resistance delta (e.g., by comparing a differential to a threshold). In one embodiment, the ADC 24 may have a limited input range before the output saturates. In order to compensate for this limited input range, in the embodiment of FIG. 3 the bias current applied to the STO element 6 comprises a coarse bias current 26 and a fine bias current 28. When detecting the resistance delta of the STO element 6, the coarse bias current is stepped in coarse steps, and the fine bias current is stepped in fine steps for each coarse step. For each coarse step of the coarse bias current 26, an offset voltage 30 is calibrated that substantially zeros the output of the differential amplifier 10 (i.e., an offset voltage 30 that substantially matches the opposite polarity voltage across the STO element due to the coarse bias current 36). After calibrating the voltage offset 30, the fine bias current 28 is adjusted over a range of fine steps and the resulting output of the ADC 24 processed at each fine step. FIG. 4 illustrates how adjusting the offset voltage 30 for each coarse step of the coarse bias current 26 prevents the output of the differential amplifier 10 from exceeding the maximum input range of the ADC 24. In the example of FIG. 4, the resistance delta of the STO element 6 is detected at the third step of the coarse bias current 26 and corresponding setting for the offset voltage 30.

Figure 5:
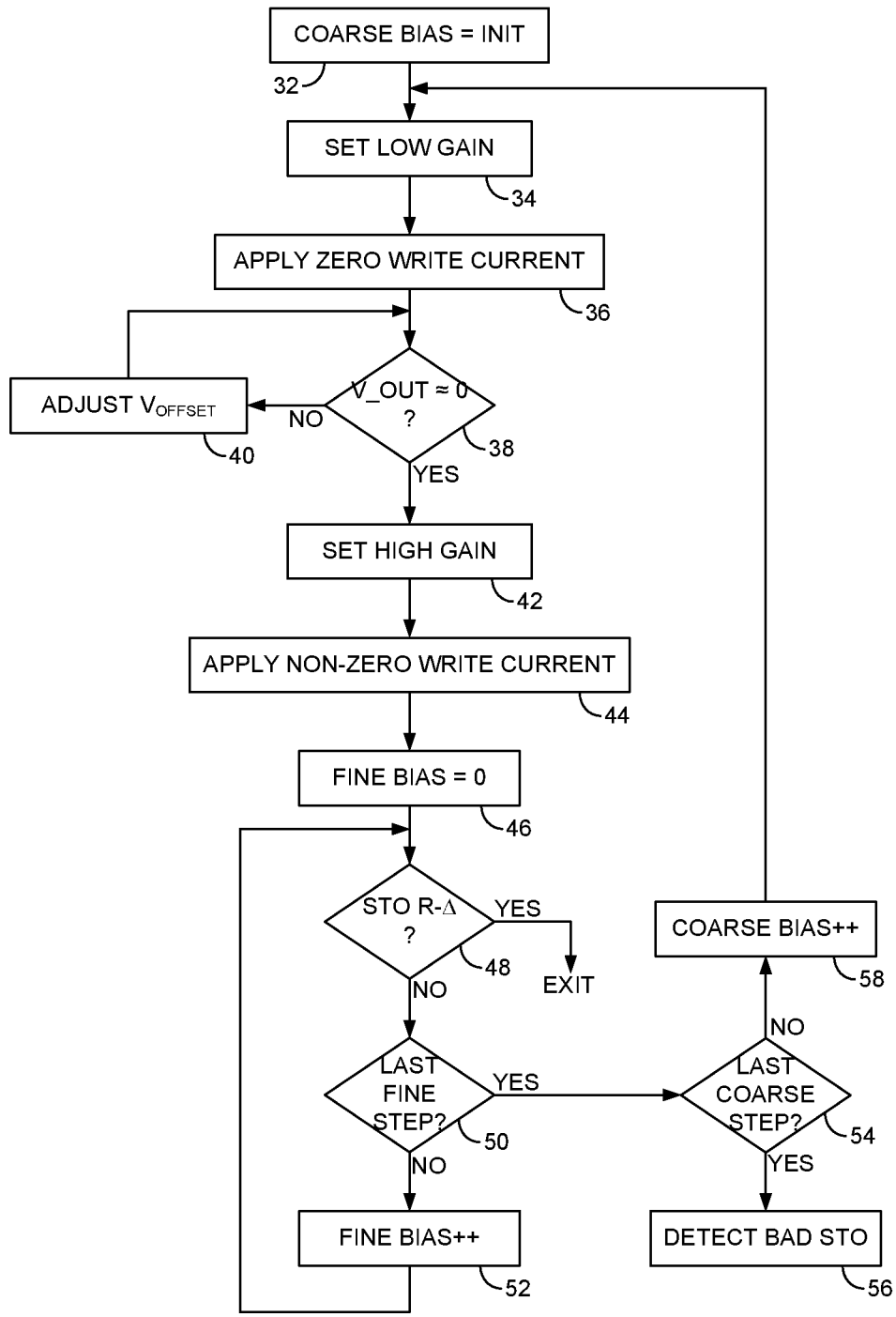
FIG. 5 is a flow diagram according to an embodiment wherein a gain of the differential amplifier is decreased when the offset voltage is adjusted.

FIG. 5 is a flow diagram according to an embodiment for detecting the resistance delta of the STO element 6 using the control circuitry shown in FIG. 3. The coarse bias current is initialized to a suitable starting value (block 32), and the differential amplifier is configured with a low gain setting (block 34) in order to calibrate the voltage offset 30 that zeros the output of the differential amplifier. A zero write current is applied to a write element of the head (block 36), and the output of the differential amplifier is measured (block 38). If the output of the differential amplifier is not substantially zero, the offset voltage is adjusted (block 40) until the output reaches substantially zero at block 38. The gain of the differential amplifier is then increased (block 42), and a non-zero write current is applied to the write element of the head (block 44) which causes the STO to begin oscillating when the bias current reaches sufficient amplitude. In one embodiment, the non-zero write current may be a DC write current so as to attenuate noise in the STO resistance delta detection circuitry.

The fine bias current is initialized to zero (block 46) and the output of the differential amplifier is processed to determine whether the resistance delta of the STO element has been detected (block 48). If the resistance delta is not detected, and the fine bias current has not reached its last fine step (block 50), the fine bias current is increased by the fine step (block 52). The flow diagram is then repeated until either the resistance delta of the STO element is detected at block 48, or the fine bias current reaches the last fine step at block 50. If the last fine step is reached, and the last coarse step has not been reached (block 54), the coarse bias current is increased by the coarse step (block 58) and the flow diagram is repeated from block 34. If the resistance delta of the STO element is detected at block 48, the coarse bias current and the fine bias current may be saved and used, for example, to configure an operating bias current for the STO element or to determine whether the resistance delta has shifted indicating a degrading STO element. If the resistance delta of the STO element is not detected after testing all of the coarse bias current steps at block 54, the control circuitry may determine the STO element is defective (block 56) and take appropriate remedial action, such as depopulating the corresponding head.

Figure 6:
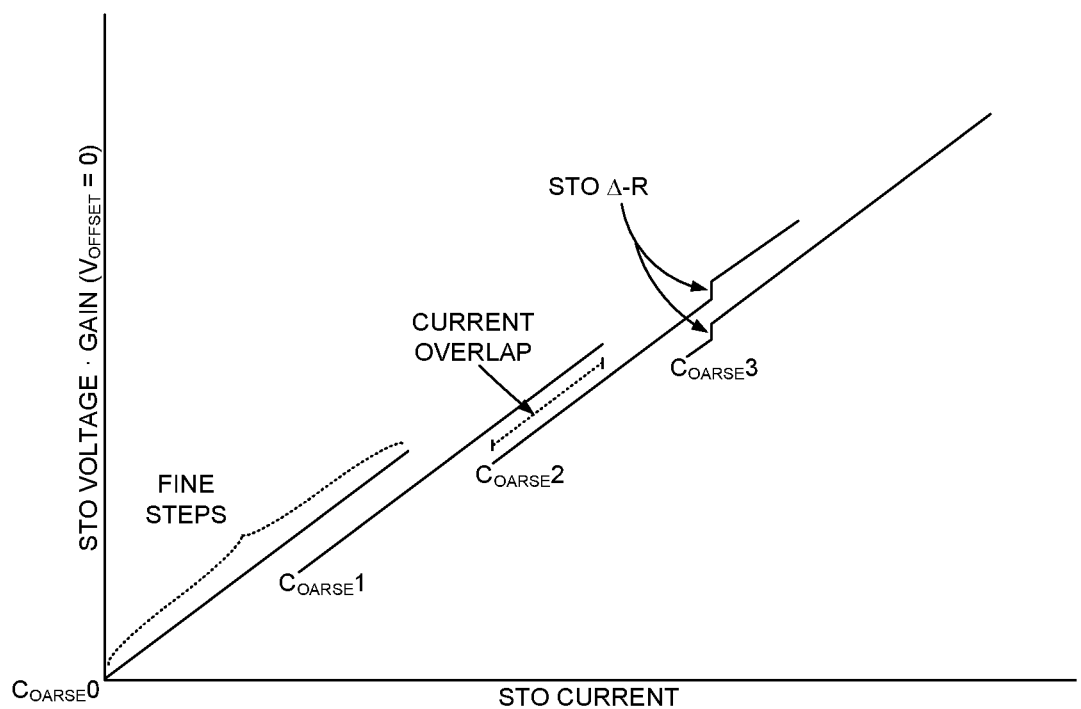
FIG. 6 shows an embodiment wherein an overlap of the fine bias current settings helps ensure the resistance delta of the STO element is accurately detected.

In one embodiment, the range of the fine bias current is configured so as to achieve overlap between consecutive coarse steps of the coarse bias current. An example of this embodiment is illustrated in FIG. 6 which is a graph of the STO voltage relative to the STO current (bias current). The bias current is generated over a first range of amplitudes when the coarse bias current is at a first coarse step and the fine bias current is adjusted over the plurality of fine steps. The bias current is generated over a second range of amplitudes when the coarse bias current is at a second coarse step consecutive with the first coarse step and the fine bias current is adjusted over the plurality of fine steps. As shown in FIG. 6, the first range of amplitudes overlaps with the second range of amplitudes. In one embodiment, this ensures there are no gaps in the bias current when transitioning between coarse steps of the coarse bias current. In addition, the overlap in bias current between coarse steps may improve the accuracy of detecting the resistance delta of the STO element by verifying the resistance delta is detected for two consecutive coarse bias currents. This is illustrated in FIG. 6 wherein the resistance delta may first be detected when the coarse bias current is configured into a second coarse step near an upper range of the fine bias current. After increasing the coarse bias current to the third coarse step, the resistance delta is again detected near the lower range of the fine bias current due to the overlap in the bias current across the coarse steps. In one embodiment, if the resistance delta is detected at a first coarse step but not detected at the adjacent coarse step, the detection of the resistance delta may be considered a false detection due, for example, to transient noise in the system instead of an actual resistance delta of the STO element.

In one embodiment, employing a differential amplifier 10 such as shown in FIG. 1B helps prevent false detections of the STO resistance delta by canceling DC noise such as bounce in the ground line. In another embodiment, the substantially DC excitation of the STO element using a finely stepped bias current together with the differential amplifier 10 enables a relatively low cut-off frequency in the low-pass filter 22 of FIG. 3, thereby attenuating noise in the output of the differential amplifier 10 that may otherwise trigger a false detection of the STO resistance delta.

In one embodiment, the gain of the differential amplifier 10 may be adjustable over multiple settings such as shown in FIG. 3 in order to account for a varying response of STO elements across a family of disk drives and/or across each production disk drive. In one embodiment, the flow diagram of FIG. 5 may be executed multiple times using different gain settings for the differential amplifier at block 42 until the resistance delta of the STO element is successfully detected. When the resistance delta is successfully detected, the gain setting for the differential amplifier may be saved for subsequent iterations of the flow diagram of FIG. 5 (e.g., in an embodiment wherein the resistance delta is measured periodically over the life of the disk drive).

In one embodiment, the resistance delta of the STO element may be measured periodically to determine whether there has been a shift in the bias current that causes the STO to oscillate. If a shift is detected, the operating bias current may be adjusted to ensure the STO element is oscillating normally during subsequent write operations. In one embodiment, when a shift in the bias current is detected (by detecting a shift in the resistance delta), the control circuitry may update a field in a Self-Monitoring, Analysis, and Reporting Technology (SMART) database to indicate the STO element may be degrading toward failure so that appropriate remedial action may be taken.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

While the foregoing is directed to embodiments of the present disclosure, other and further embodiments of the disclosure may be devised without departing from the basic scope thereof, and the scope thereof is determined by the claims that follow.

What is claimed is:

1. A data storage device comprising:
   a disk;
   a head actuated over the disk; and
   control circuitry comprising a differential amplifier comprising a first input coupled to a first end of a single spin torque oscillator (STO) element and a second input coupled to a second end of the single STO element, wherein the head comprises the single STO element, and wherein the control circuitry is configured to:
   apply a bias current to the single STO element;
   adjust the bias current; and
   detect a resistance delta of the single STO element based on an output of the differential amplifier, wherein the resistance delta corresponds to a bias current level when the single STO begins to oscillate.

2. A data storage device comprising:
   a disk;
   a head actuated over the disk, wherein the head comprises a spin torque oscillator (STO) element; and
   control circuitry comprising a differential amplifier comprising a first input coupled to a first end of the STO element and a second input coupled to a second end of the STO element, wherein the control circuitry is configured to:
   apply a bias current to the STO element;
   adjust the bias current; and
   detect a resistance delta of the STO element based on an output of the differential amplifier, wherein the resistance delta corresponds to a bias current level when the STO begins to oscillate,
   wherein the bias current comprises a coarse bias current and a fine bias current, and the control circuitry is further configured to adjust the bias current by:
      adjusting the coarse bias current by a coarse step over a plurality of coarse steps; and
      for each coarse step, adjust the fine bias current over a plurality of fine steps.

3. The data storage device as recited in claim 2, wherein:
   the bias current is generated over a first range of amplitudes when the coarse bias current is at a first coarse step and the fine bias current is adjusted over the plurality of fine steps;
   the bias current is generated over a second range of amplitudes when the coarse bias current is at a second coarse step consecutive with the first coarse step and the fine bias current is adjusted over the plurality of fine steps; and
   the first range of amplitudes overlaps with the second range of amplitudes.

4. The data storage device as recited in claim 2, wherein the control circuitry further comprises an offset voltage, and the control circuitry is further configured to adjust the offset voltage for each coarse step until the output of the differential amplifier is substantially zero.

5. The data storage device as recited in claim 4, wherein the head further comprises a write coil and the control circuitry is further configured to:
   apply a substantially zero write current to the write coil of the head when adjusting the offset voltage; and
   apply a non-zero write current to the write coil of the head when adjusting the fine bias current over the plurality of fine steps.

6. The data storage device as recited in claim 5, wherein the non-zero write current is a DC write current.

7. The data storage device as recited in claim 4, wherein the control circuitry is further configured to:
   decrease a gain of the differential amplifier prior to adjusting the offset voltage; and
   increase the gain of the differential amplifier prior to adjusting the fine bias current over the plurality of fine steps.

8. A method of operating a data storage device, the method comprising:
   applying a bias current to a single spin torque oscillator (STO) element of a head actuated over a disk;
   adjusting the bias current; and
   detecting a resistance delta of the single STO element based on an output of a differential amplifier comprising a first input coupled to a first end of the single STO element and a second input coupled to a second end of the single STO element, wherein the resistance delta corresponds to a bias current level when the single STO begins to oscillate.

9. A method of operating a data storage device, the method comprising:
   applying a bias current to a spin torque oscillator (STO) element of a head actuated over a disk;
   adjusting the bias current; and
   detecting a resistance delta of the STO element based on an output of a differential amplifier comprising a first input coupled to a first end of the STO element and a second input coupled to a second end of the STO element, wherein the resistance delta corresponds to a bias current level when the STO begins to oscillate,
   wherein the bias current comprises a coarse bias current and a fine bias current, and adjusting the bias current comprises:
      adjusting the coarse bias current by a coarse step over a plurality of coarse steps; and
      for each coarse step, adjust the fine bias current over a plurality of fine steps.

10. The method as recited in claim 9, further comprising:
    generating the bias current over a first range of amplitudes when the coarse bias current is at a first coarse step and the fine bias current is adjusted over the plurality of fine steps; and
    generating the bias current over a second range of amplitudes when the coarse bias current is at a second coarse step consecutive with the first coarse step and the fine bias current is adjusted over the plurality of fine steps, wherein the first range of amplitudes overlaps with the second range of amplitudes.

11. The method as recited in claim 9, further comprising adjusting an offset voltage for each coarse step until the output of the differential amplifier is substantially zero.

12. The method as recited in claim 11, further comprising:
    applying a substantially zero write current to a write coil of the head when adjusting the offset voltage; and
    applying a non-zero write current to the write coil of the head when adjusting the fine bias current over the plurality of fine steps.

13. The method as recited in claim 12, wherein the non-zero write current is a DC write current.

14. The method as recited in claim 11, further comprising:
    decreasing a gain of the differential amplifier prior to adjusting the offset voltage; and
    increasing the gain of the differential amplifier prior to adjusting the fine bias current over the plurality of fine steps.

15. A data storage device, comprising:
    a disk;
    a head actuated over the disk, wherein the head comprises a spin torque oscillator (STO) element;

means for applying a bias current to the STO element, wherein the bias current comprises a coarse bias current and a fine bias current;

means for adjusting the bias current by:
adjusting the coarse bias current by a coarse step over a plurality of coarse steps; and
for each coarse step, adjust the fine bias current over a plurality of fine steps; and means for detecting a resistance delta of the STO element based on an output of a differential amplifier comprising a first input coupled to a first end of the STO element and a second input coupled to a second end of the STO element, wherein the resistance delta corresponds to a bias current level when the STO begins to oscillate.

16. The data storage device as recited in claim 15, wherein:
the bias current is generated over a first range of amplitudes when the coarse bias current is at a first coarse step and the fine bias current is adjusted over the plurality of fine steps;
the bias current is generated over a second range of amplitudes when the coarse bias current is at a second coarse step consecutive with the first coarse step and the fine bias current is adjusted over the plurality of fine steps; and
the first range of amplitudes overlaps with the second range of amplitudes.

17. The data storage device as recited in claim 15, further comprising means for adjusting an offset voltage for each coarse step until the output of the differential amplifier is substantially zero.

18. The data storage device as recited in claim 17, further comprising:
means for applying a substantially zero write current to a write coil of the head when adjusting the offset voltage; and
means for applying a non-zero write current to the write coil of the head when adjusting the fine bias current over the plurality of fine steps.

19. The data storage device as recited in claim 18, wherein the non-zero write current is a DC write current.

20. The data storage device as recited in claim 17, further comprising:
means for decreasing a gain of the differential amplifier prior to adjusting the offset voltage; and
means for increasing the gain of the differential amplifier prior to adjusting the fine bias current over the plurality of fine steps.

\* \* \* \* \*